Nov. 25, 1952     H. U. GARRETT ET AL     2,619,109
RELIEF VALVE

Filed May 29, 1950     2 SHEETS—SHEET 1

Henry U. Garrett
Clifford M. Peters
INVENTORS

BY
Browning & Simms
ATTORNEYS

Henry U. Garrett
Clifford M. Peters
INVENTORS

Patented Nov. 25, 1952

2,619,109

UNITED STATES PATENT OFFICE 2,619,109

RELIEF VALVE

Henry U. Garrett and Clifford M. Peters, Houston, Tex., assignors to Garrett Oil Tools, Inc., Houston, Tex., a corporation of Texas Application May 29, 1950, Serial No. 164,872

6 Claims. (Cl. 137—488)

This invention relates to improvements in pressure relief valves and refers more particularly to that class of pressure relief valves which is self-closing after a partial relief of the pressure in the system to be protected.

This invention is an improvement to the pressure responsive valve shown in the co-pending application for United States Letters Patent filed February 7, 1949, Serial Number 74,875, now Patent No. 2,552,892.

In relief valves of this general type, that have heretofore been available, the valves when opened remained open only for a finite time period which was determined by the rate of bleed of pressure fluid in back of the pressure responsive member of the actuating mechanism after the snap action, self-closing pilot closed. This does not present any undue problem in low pressure use and where the amount of fluid to be relieved in order to effect a proper reduction of pressure is not excessive. However, for many uses, such as relief valves upon large pipe lines used for transmitting fuel gas, and more particularly those such as are known as the "Big Inch" transmission lines, the valves have not been especially adaptable because of the relatively high pressures existing within these pipe lines and because of the large quantity of gas that must be relieved in order to adequately reduce the line pressure. It has been found in these large lines that the amount of blow down is so great that the valve members hammer against their seats a number of times on each blow down and this results in damage to the valve seats and the valve members because of the force with which the valves are closed due to the relatively high pressures within the systems.

An object of this invention is to provide a relief valve of this general class which will open upon occurrence of a predetermined high pressure within the system to be protected and will remain open until the pressure within the system has been blown down to a predetermined low pressure.

Another object is to provide a relief valve of this general class which will open upon occurrence of a predetermined maximum pressure within the system to be protected and will positively remain open without any tendency to chatter or throttle until the line pressure has been reduced to a predetermined safe pressure and will then positively close.

A further object is to provide a differential piston type relief valve with means for closing the bleed for supplying pressure fluid in back of the piston to provide a force opposing the force acting against the valve member due to the pressure of the system protected, when the valve member is in open position and an auxiliary pilot controlled passage for pressurizing the piston to reclose the valve, in which the auxiliary passage is maintained shut until the pressure within the system protected is relieved to a predetermined low value.

Other and further objects of the invention will appear as the description proceeds.

In the accompanying drawings forming a part of the instant specification and wherein like reference numerals are used to indicate like parts in the various views.

Figure 1:
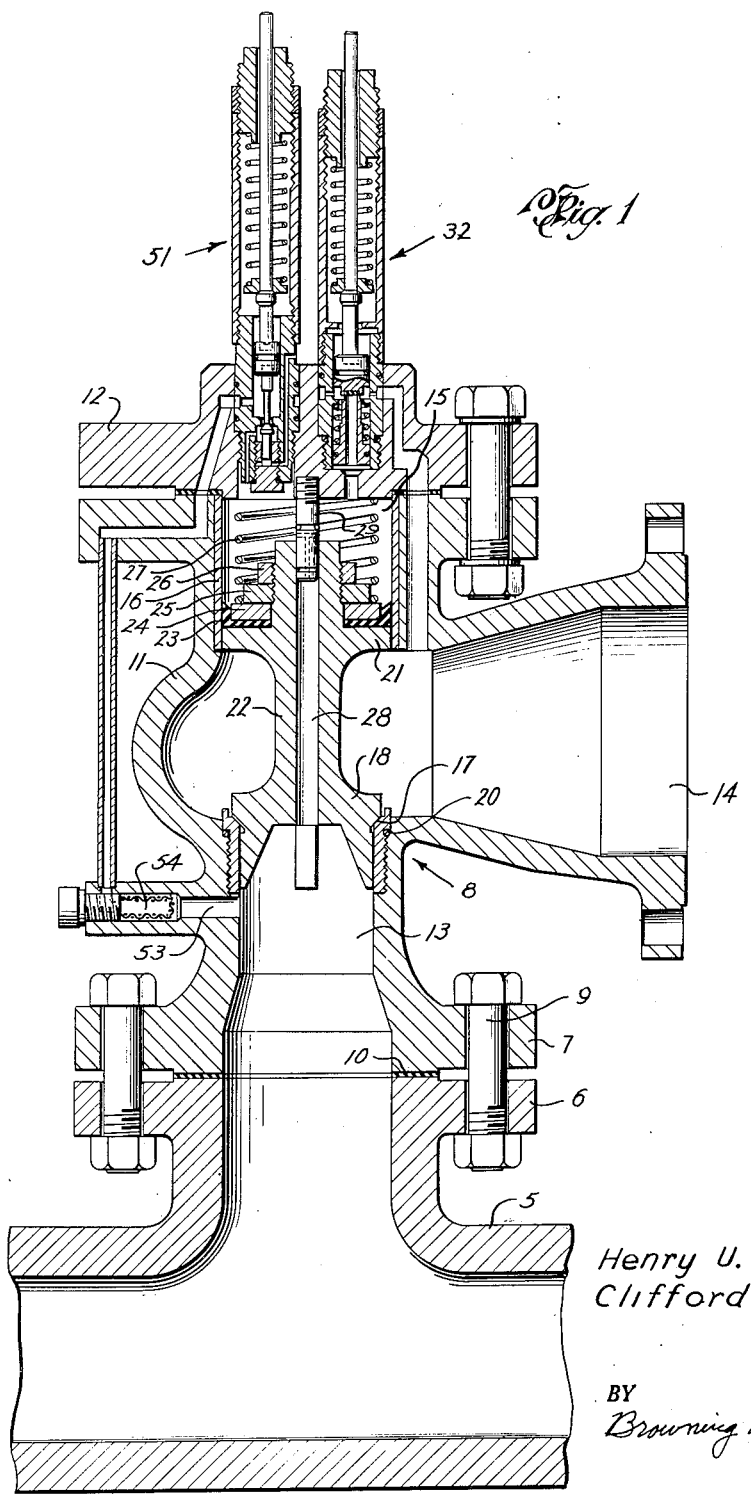
Fig. 1 is a vertical cross-sectional view through a relief valve constituting a preferred embodiment of the present invention.

Referring to the drawings in detail and more particularly to Fig. 1, the reference numeral 5 designates a conduit or pipe line of a pressure system to be protected against excessive pressures. The relief valve of this invention may be connected thereto in any suitable manner as by the flange coupling including the flange 6 formed on the pipe line and the flange 7, formed on the valve 8, with suitable connecting bolts 9 and a gasket 10 sealing the joint between the flanges.

The relief valve comprises a casing made up of a casting 11 and a bonnet 12. The casing is provided with a pressure relief port 13 and an outlet port 14 for discharging fluid from the system protected. The interior of the casing includes a chamber 15 which is preferably cylindrical and in axial alignment with the relief port 13. A removable liner 16 may provide the cylindrical surface and this is used for the purpose of providing a wear member.

A seat 17 is provided for the relief port 13 and is adapted to receive the valve member 18 which engages the seat and is urged therefrom by the pressure within the system protected. Preferably, the seat 17 is provided upon a removable element 19 threaded to the casting 11 with a seal element 20 assuring a seal between the seat and casting.

A pressure responsive member which may be a piston 21 resides within the casing and separates the chamber 15 from the relief port and outlet port. Piston 21 has a power transmitting connection 22 with the valve member 18.

In the interest of simplicity, it is preferred to form the piston and valve member as an integral unit. The piston may be made up on the end of the connection 22 by providing a seal cup 23 backed up by the enlarged diameter portion of the unit. An expander washer 24 holds the piston cup in expanded position and is secured in place by lock nuts 25 and 26.

The cylinder 15 and piston 21 have larger diameters and effective pressure areas than those of the seat 17 and valve member 18. Thus, it will be apparent that if pressure within chamber 15 is equalized with that within the system protected, the resultant force due to pressure acting against the piston and valve member will hold the valve member closed. The spring 27 is relatively weak and urges the piston and valve member toward seated position, but is provided only to insure proper seating of the valve when no pressure is acting thereon and may actually be dispensed with entirely.

Figures 2, 3:
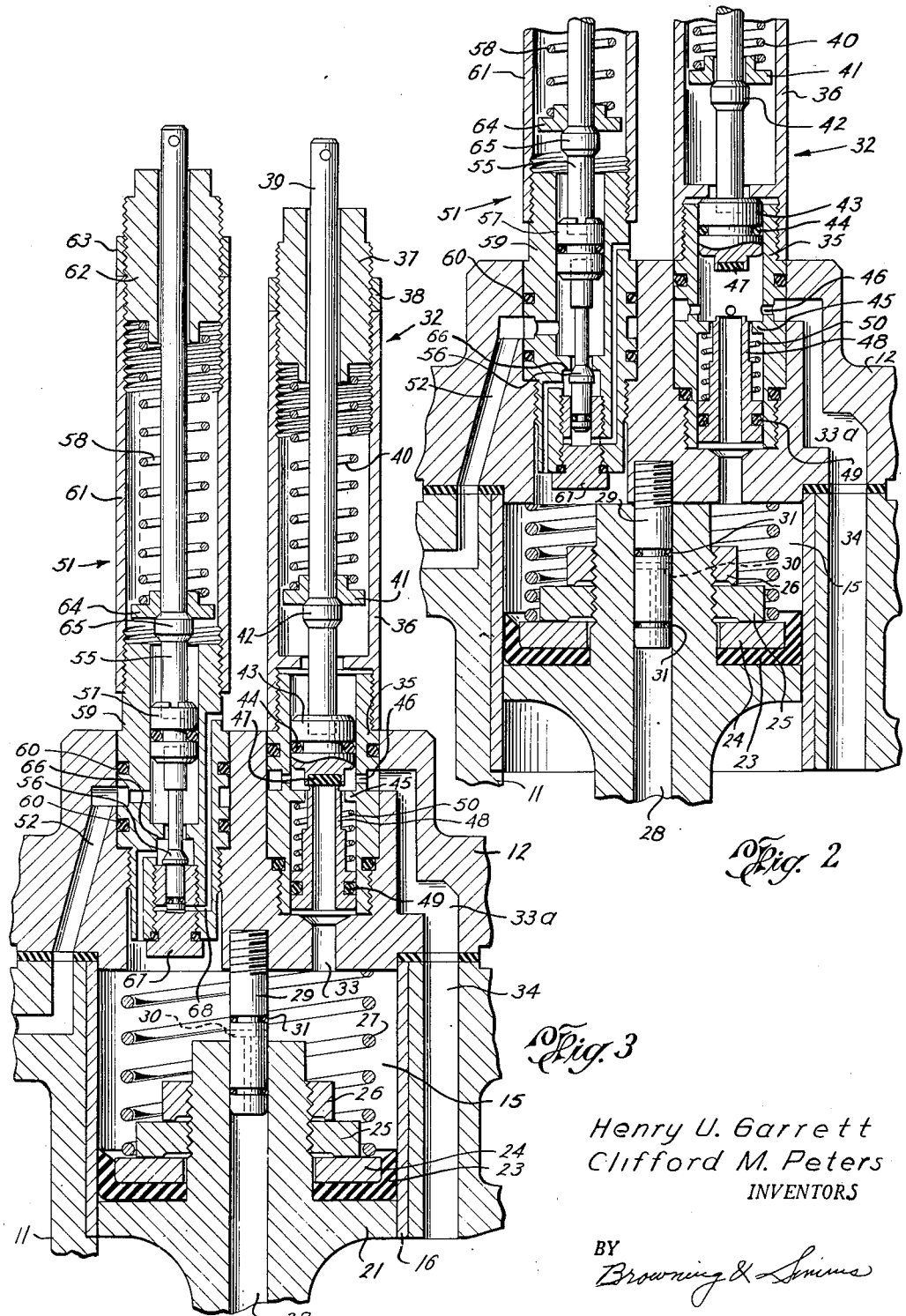
Fig. 2 is a fragmenetary view, upon an enlarged scale, of the upper portion of the relief valve shown in Fig. 1 and showing the high pressure pilot valve in open position.
Fig. 3 is a view similar to Fig. 2 but illustrating the high pressure pilot valve closed and the low pressure pilot for admitting fluid in back of the closing piston, in open position.

A bleed means is provided for supplying pressure fluid from the system protected to chamber 15 when the valve member is seated. This means may include the central passage 28 through the valve member-piston unit, but means is provided to close this passage when the valve member is in open position. This latter means will be best understood by reference to Figs. 2 and 3 and may include an element or bolt 29 depending from the bonnet 12. This bolt has a central passage 30 which is a constriction or choke with laterally extending end ports. Seal elements, as for example, O-rings 31, are provided for sealing between the pin 29 and passage 28 on both sides of the lateral ports, when the piston-valve unit is in its Fig. 2 or open position. On the other hand, when the valve member is seated, as shown in Figs. 1 and 3, the passages 28 and 30 establish a communication between the interior of chamber 15 and the pressure system protected. However, the capacity of the passage 30 is so small that the pressure slowly bleeds into chamber 15.

In order to unbalance the forces due to pressure acting on piston 21 and valve member 18, upon occurrence of a predetermined maximum pressure within the system protected, in a manner to cause opening of the relief valve, a high pressure pilot relief mechanism is provided for relieving pressure within chamber 15. This pilot means is of the self-closing, snap action type but preferably should be of the type that will remain open for a finite time period sufficient to provide for relief of the pressure within chamber 15. This pilot relief means is shown generally at 32 in Figs. 1, 2 and 3.

A novel relief valve has been developed for this purpose and is preferred but it is to be understood that other relief valves of this general class can be employed with reasonably satisfactory results.

The novel preferred pilot valve controls the relief port 33 in the bonnet. The capacity of relief port 33 is much greater than that of bleed port 30 so that the pressure within chamber 15 is quickly vented when port 33 is open. The port 33 has a portion 33a that communicates with a passage 34 formed in casting 11 and this in turn communicates with the outlet port 14.

The pilot valve resides in an enlarged portion of the port 33 and comprises a fitting 35 threaded in the bonnet. This fitting carries at its upper end a housing 36 with a perforated bushing nut 37 threaded therein. A lock washer 38 secures the bushing nut 37 in adjusted position. A valve stem 39 extends through nut 37 and is pressed downwardly by control spring 40 which engages the lower end of nut 37 and a guide 41 formed on stem 39. The guide 41 abuts an enlargement 42 on the stem so that compression of the spring urges the stem downwardly. The lower end of the stem carries a plunger 43 having a sliding seal within an enlarged bore in fitting 35. The seal may be of the O-ring type with a seal element 44 residing in a peripheral groove formed in the plunger.

Fitting 35 has a bore therethrough with a reduced diameter portion providing shoulder 45 and with lateral openings 46 communicating between the interior of the fitting and the portion 33a of the vent passage. This passage is controlled by a valve insert 47 carried on the underside of plunger 43, which is adapted to engage the upper end of a sleeve 48. Sleeve 48 has a sliding seal mounting within the lower portion of the bore through fitting 35 and suitable seal elements such as O-rings 49 prevent escape of fluid between the fitting and the sleeve. A relatively weak coil spring 50 is compressed between the shoulder formed by reduced portion 45 of the bore through fitting 35 and an external shoulder on the periphery of the lower end of sleeve 48.

This arrangement is such that the pressure within chamber 15 is active against the lower end of sleeve 48 and the portion of valve insert 47, which is exposed within sleeve 48. However, the travel of sleeve 48 is limited by shoulder 45. When the sleeve 48 has seated against shoulder 45, additional movement of the valve stem 39 against spring 40 must be under the influence of the pressure acting against the relatively small area enclosed within sleeve 48. When the valve is cracked from sleeve 48, spring 50 immediately returns sleeve 48 to its lower position and the pressure is active against the enlarged area of the plunger 43 to urge it with even greater force upwardly against the spring 40. This provides a substantial finite time period between unseating of the valve and reseating of the valve under the influence of spring 40. During this period, the pressure within chamber 15 is substantially blown down to permit opening of the relief valve because the capacity of the vent is much greater than that of bleed passage 30. By reference to Fig. 2, it is apparent that the bleed for supplying pressure fluid to the interior of chamber 15 is closed when the valve member 18 is open. Thus, when the relief pilot 32 recloses, the pressure within chamber 15 will not build up so that the relief valve 18 will remain open until the pressure within chamber 15 is again built up. The admission of pressure fluid to chamber 15, so as to reclose the main relief valve member 18, is controlled by the low pressure pilot valve means shown generally at 51.

The low pressure pilot valve 51 controls a passage 52 which may communicate with the pressure system to be controlled at any desirable point as, for instance, by fitting 53 which communicates with the interior of casting 11 just below the valve seat 17. A screen 54 may be placed in the passage 53 to filter out any foreign material within the gas which flows through the passage.

The low pressure pilot means is shown in Fig. 2 in its closed position and in Fig. 3 in its open position. It includes generally a spring pressed plunger 55 and a valve element 56. The plunger has an enlarged portion 57, which is exposed to the pressure from passage 52 so that the force of the pressure acting against the portion 57 opposes the compression spring 58. Thus, when the pressure within passage 52, which it will be remembered is the pressure within the system protected, falls below a predetermined value, the spring 58 will move the plunger 55 downwardly to unseat valve 56.

The detailed construction of the pilot relief means includes a fitting 59, which has a sealed connection in bonnet 12, the O-ring 60 sealing between the communication between the interior of fitting 59 and the passage 52. Fitting 59 has a housing 61 threaded thereto, which has an adjustable compression nut 62 at its upper end, which may be locked in adjusted position by lock washer 63. The spring 58 is compressed between the lower end of nut 62 and guide 64 which rests against an enlargement 65 formed on the plunger or valve stem 55. The valve 56 is adapted to seat on shoulder 66 within fitting 59.

In order to balance out the effect of the pressures that would be active against the area enclosed within the seated valve member 56 and against this same area with the valve member closed, an arrangement has been provided for always exposing a portion of the stem 55 of an area equal to that portion of valve member 56 within seat 66, to atmospheric pressure regardless of whether the valve member 56 is seated or unseated. This includes the insert 67 threaded into the lower end of fitting 59. This insert has a bore for receiving the lower end of plunger 55 and an O-ring seal is preferably provided between the periphery of the lower end of the plunger and the inner wall of the bore. A vent passage 68 communicates between the lower end of the bore and insert 67 and the atmosphere.

Operation of this low pressure relief valve is believed apparent. With the valve member 56 seated, the pressure from the pressure system protected, is active against the area of enlargement 57 less the area of the valve member enclosed within seat 66. This latter area is the same as the area of the bore in insert 67. The force due to pressure acting against the plunger 57 urges it upwardly against the compression spring 58. When the force due to this pressure falls below the compression of spring 58, the spring forces the plunger 55 and valve member 56 downwardly to unseat the valve member. The lower end of the plunger is still exposed to atmosphere so unseating of the valve member 56 does not disturb the balance of forces due to pressure acting against the plunger and opposing the spring. Whenever the pressure within the pressure system protected rises above a predetermined value, which may be adjusted by turning the nut 62 thereby altering the compression of spring 58, valve member 56 will be reseated.

It is believed that the operation of the various parts of the relief valve of this invention is apparent from the foregoing description. However, a brief description of the operation of the relief valve as a whole will be given to insure a complete disclosure of the invention.

The relief valve may be mounted upon any pressure system to be protected and with the relief valve closed, the pressure of the system protected is active against the area of valve member 18, which is enclosed within seat 17, urging the valve member toward unseated position. However, this same pressure bleeds through passages 28 and bleed passage 30 into chamber 15 and is active against the relatively large area of piston 21 in a direction to seat the valve member 18. Also, the relatively weak spring 27 urges the valve member toward seated position.

As long as the pressure within the system protected is below the selected safe maximum, the relief valve member 18 will remain closed. However, when this pressure exceeds a selected maximum, the high pressure relief pilot 32 is opened and quickly effects a reduction of the pressure within chamber 15 so that the pressure acting against the valve member 18 causes the valve member to rise against the forces acting against piston 21 in the opposing direction. When the valve member is in open position, the bleed port 30 is closed off so that the pressure within chamber 15 remains relieved until the pressure within the system protected falls below a predetermined lower limit. When this occurs, the low pressure relief valve 51 is opened to supply pressure fluid to chamber 15. This pressure fluid is substantially the same as that acting against the valve member 18 to hold it open and being effective against a greater area than the area of valve member 18, the valve member is forced to a closed position. As soon as the pressure within the system protected builds up above the lower limit, the low pressure relief valve 51 will close. It will be appreciated, however, that if at any time the pressure within the system protected falls below the predetermined low limit so that valve 51 opens, this will not have any effect upon the relief valve 18 but that it will remain closed.

The novel construction of the high pressure pilot 32 is such that as the pressure within chamber 15 approaches a predetermined maximum, sleeve 48 will seat against shoulder 45. This has permitted some compression of the spring 40 but additional compression of the spring 40 will be responsive only to the force of the pressure acting against the relatively small area within sleeve 48. Therefore, the spring 40 will be substantially compressed to an out-of-the-way position at the time that the valve member 47 cracks from seat 48 so that the sleeve and valve member will be substantially separated, as shown in Fig. 2, when the spring 50 returns the sleeve to its lower position. Also, the large area of plunger 43, exposed to the pressure, upon cracking of the valve seat insert 47 from the end of sleeve 48, will increase the force tending to resist the spring 40. This arrangement assures a definite time lag between opening of the vent for relieving pressure from chamber 15 and reclosing of the valve so as to assure complete venting of the chamber 15 for a much lower pressure, than that required to crack the valve, will hold the plunger in open position.

Also, the arrangement of the novel pilot relief valve is such that there will be no accidental throttling or chattering of the pilot valve as the pressure within chamber 15 approaches the predetermined maximum pressure. This is very important where gas under high pressure is being transported through transmission lines leading from the gas fields of the southwestern portion of the United States to the eastern sea coast. Otherwise the rather expensive gas is needlessly wasted if the pressure within the line tends to approach the maximum pressure believed to be safe for the line. Therefore, this novel relief valve makes it possible to transport gas through the line at very near the maximum safe pressure for the line. Of course, the volume of gas that can be passed through the line is greater at increased pressures than at lower pressures and this is a very valuable feature of the present invention.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a pressure relief valve a casing with a relief port and a discharge port, a seat and valve member controlling the relief port, said valve member urged from its seat by the pressure fluid to be controlled, a pressure responsive means for holding the valve member in closed position when the pressure to be controlled is within selected limits comprising a chamber and pressure responsive member, the latter connected to the valve member for controlling same, bleed means for supplying pressure fluid to be controlled to the chamber behind the pressure responsive member, when the valve member is seated, means closing the bleed with the valve member in open position, a snap action, self-closing, high pressure relief pilot means for relieving the pressure within the chamber when the pressure therein exceeds a predetermined value, a passage for supplying pressure fluid from the system to be controlled to the chamber, and a self-closing low pressure relief pilot means controlling the latter passage and adapted to open when the pressure in the passage is less than a selected value.

2. In a pressure relief valve a casing with a relief port and a discharge port, a seat and valve member controlling the relief port, said valve member urged from its seat by the pressure fluid to be controlled, a chamber within the casing and a piston reciprocally mounted in the chamber, said piston having a power transmitting connection with the valve member, bleed means for supplying pressure fluid to be controlled to the chamber behind the piston when the valve member is seated, means closing the bleed with the valve member in open position, a snap action, self-closing, high pressure relief pilot means for relieving the pressure within the chamber when the pressure therein exceeds a predetermined value, a passage for supplying pressure fluid from the system to be controlled to the chamber, and a self-closing low pressure relief pilot means controlling the latter passage and adapted to open when the pressure in the passage is less than a selected value.

3. In a pressure relief valve a casing with a relief port, a discharge port and a pressure chamber separate from said ports; a valve member controlling the relief port and urged toward unseated position by the pressure fluid controlled; a pressure responsive member of greater effective area than that of the valve member, separating the chamber from the relief and outlet ports; a power transmitting connection between the pressure responsive member and valve member for controlling the latter; a bleed for supplying pressure fluid from the pressure system to be controlled to the chamber; means responsive to the position of the valve member to close the bleed when the valve member is in open position; a snap action, self-closing high pressure relief pilot means for relieving the pressure within the chamber when the pressure therein exceeds a predetermined value; a passage for supplying pressure fluid from the system to be controlled to the chamber; and a self-closing low pressure relief pilot means controlling the latter passage and adapted to open when the pressure in the passage falls below a selected value.

4. In a pressure relief valve a casing with a relief port, a discharge port, and a pressure chamber separate from said ports; a valve member controlling the relief port and urged toward unseated position by the pressure fluid controlled; a piston of greater effective area than the area of the valve member, separating the chamber from the relief and outlet ports; a power transmitting connection between the piston and valve member for controlling the latter; a bleed for supplying pressure fluid from the pressure system to be controlled to the chamber; means responsive to the position of the valve member to close the bleed when the valve member is in open position; a snap action, self-closing high pressure relief pilot means for relieving the pressure within the chamber in back of the piston when the pressure therein exceeds a predetermined value; a passage for supplying pressure fluid from the system to be controlled to the chamber in back of the piston; and a self-closing low pressure relief pilot means controlling the latter passage and adapted to open when the pressure in the passage falls below a selected value.

5. In a pressure relief valve a casing having a cylinder therein and a pressure relief port axially aligned with the cylinder but of smaller diameter than the cylinder and an outlet port; a member having a piston at one end and a valve member at the other end, said valve member adapted to control the relief port and to be urged toward open position by the pressure controlled; a passage through the member adapted to establish communication between the cylinder on the side of the piston remote from the valve member and the relief port upstream from the valve member; an element carried by the casing and extending into said passage, said element having a bleed passage for establishing communication between the cylinder and the interior of said passage through the member when the member is in position with the valve member in closed position, means between said element and member adapted to close the passage through the element when the valve member is in open position; a high pressure pilot relief means adapted to relieve the pressure within the cylinder upon occurrence of a predetermined high pressure; and a separate passage and pilot relief means adapted to supply pressure to the cylinder in back of the piston from the system to be controlled by the relief valve upon occurrence of a predetermined low pressure within the system.

6. In a pressure relief valve of the type having an integrated valve member and actuating piston of differential areas with means for bleeding pressure fluid to be controlled in back of the piston to hold the valve member closed and with snap action means for relieving the pressure in back of the piston upon occurrence of a predetermined maximum pressure in the system protected, the improvement which resides in the combination therewith of means closing the bleed for supplying pressure fluid to the piston when the valve member is in unseated position and pilot control means for supplying pressure from the system to be protected to the piston to move the valve member from said unseated position to seated position upon occurrence of a predetermined low pressure within the system to be protected.

HENRY U. GARRETT.
CLIFFORD M. PETERS.

REFERENCES CITED

The following references are of record in the file of this patent:

UNITED STATES PATENTS

| Number | Name | Date |
|---|---|---|
| 134,435 | Mayer | Dec. 31, 1872 |
| 135,437 | Mayer | Feb. 4, 1873 |
| 1,319,154 | Johnson | Oct. 21, 1919 |
| 1,611,079 | Roschanek | Dec. 14, 1926 |
| 1,805,702 | Mastenbrook | May 19, 1931 |
| 2,375,411 | Grant | May 8, 1945 |